US005664637A

United States Patent [19]

Ohta et al.

[11] Patent Number: 5,664,637

[45] Date of Patent: Sep. 9, 1997

[54] OPERATION BREAKING APPARATUS FOR CONSTRUCTION EQUIPMENT

[75] Inventors: Makoto Ohta; Eiji Akahane; Seiichi Hata, all of Tokyo; Kenzo Kuroda; Shosuke Sato, both of Saitama, all of Japan

[73] Assignees: Shin Caterpillar Mitsubishi Ltd., Tokyo; Kansei Corporation, Saitama, both of Japan

[21] Appl. No.: 603,763

[22] Filed: Feb. 20, 1996

[30] Foreign Application Priority Data

Jul. 12, 1995 [JP] Japan .................................... 7-175735

[51] Int. Cl.$^6$ .................................................... B60K 28/00

[52] U.S. Cl. ............................................ 180/286; 180/272

[58] Field of Search .................................... 180/271, 272, 180/286

[56] References Cited

U.S. PATENT DOCUMENTS

| | | | |
|---|---|---|---|
| 3,993,157 | 11/1976 | Schulte | 180/286 |
| 4,318,571 | 3/1982 | Vize | 180/286 |
| 5,050,700 | 9/1991 | Kim | 180/272 |
| 5,383,532 | 1/1995 | Shonai et al. | 180/271 |
| 5,520,258 | 5/1996 | Kemshall | 180/286 |

FOREIGN PATENT DOCUMENTS

| | | |
|---|---|---|
| 0 066 380 | 12/1982 | European Pat. Off. . |
| 0 092 248 | 10/1983 | European Pat. Off. . |
| 4-30032 | 2/1992 | Japan . |

*Primary Examiner*—Kenneth R. Rice
*Attorney, Agent, or Firm*—Oliff & Berridge

[57] ABSTRACT

An operation prohibiting apparatus for construction equipment of improved controllability. A cutoff bar is positioned is a first position in which the cutoff bar protrudes across the entryway to an operator cab of the construction equipment. The cutoff bar is operationally linked with a locking mechanism for a hydraulic valve system of the construction equipment so that an operating mechanism for the system is unlocked when the cutoff bar is positioned in the first protruding position. A displacement enlarging mechanism is provided between an operating knob and the cutoff bar to facilitate manual positioning of the cutoff bar. Further, the cutoff bar is provided with flexibility to prevent possible damage to the cutoff bar.

15 Claims, 7 Drawing Sheets

OPERATION BREAKING APPARATUS FOR CONSTRUCTION EQUIPMENT

BACKGROUND OF THE INVENTION

1. Field of the Invention

The present invention relates to an operation prohibiting apparatus for use in construction equipment, such as a power shovel.

2. Description of the Prior Art

A known operation prohibiting apparatus, for example a cutoff bar, is generally placed at an operator entryway of an operator cab of such a construction equipment, such as a power shovel. A known operation prohibiting apparatus will be described hereinbelow with reference to FIG. 7. An operator cab 1 is equipped with an entryway 2 open at one side of the machine body, so that the operator can get in and out of the construction equipment therethrough. An operating box 4 is disposed at the front and side of an operator's seat 3 and is provided with an operating lever 5 for operating cylinders (not shown) for driving booms and arms. Where the operating lever 5 is operated in error when the operator gets in and out of the operator's seat 3, any one of the cylinders can work accidentally. In addition, even where the engine is not in operation, if the operating lever 5 is operated by mistake when the booms or the arms are in a lifted condition, the bucket, together with the booms and the arms, can move accidentally.

For these reasons, in the prior art construction equipment, a cutoff bar 6 is designed to protrude across the entryway to the operator's seat in a first position and to be returnable to a non-protruding, second position. The cutoff bar 6 is operationally linked with a locking mechanism for a hydraulic valve for driving the cylinders so that an operating mechanism for the cylinders is unlocked when the cutoff bar 6 is in the first, protruding position.

A problem arises with such a prior art cutoff bar that it is difficult to lift the cutoff bar. The cutoff bar rotates between a generally vertical position and a generally horizontal position, and is moved manually to the generally horizontal position to gate the entryway and to the generally vertical position to allow passing of the operator into the cab. Also, the operated angular range of the cutoff bar needs to be a rotational range (stroke) of approximately 90 degrees. Accordingly, the prior art cutoff bar is difficult to raise.

Moreover, since a pivot shaft of the cutoff bar is situated under the operator cab 1, the operation of the cutoff bar requires the operator to bend forward reducing its controllability. Furthermore, since the cutoff bar is placed within the space between the operating box 4 and an inner wall of the operator cab, a further problem arises in that the effective space within the operator cab is reduced.

SUMMARY OF THE INVENTION

The present invention has been developed to eliminate the above-mentioned problems. It is therefore an object of the invention to provide a cutoff bar, which can be positioned in a first position in which it protrudes across the entryway and in a second, withdrawn position, and which is capable of being shifted with a short operating stroke.

Another object of the invention is to prevent the cutoff bar from being damaged by providing the cut off bar with flexibility.

For the first-mentioned purpose, in accordance with a preferred embodiment of the invention, an operation prohibiting apparatus is provided for construction equipment in which an operating box is located adjacent an operator's seat within an operator cab of the construction equipment. An operating lever of the operating box operates a cylinder of a working member and a cutoff bar is situated in the entryway to the operator's seat such that it can be positioned in a first position in which it protrudes across the entryway and in a second, withdrawn position. The cutoff bar is linked with a locking mechanism of a hydraulic driving system for driving the cylinder such that the locking mechanism is unlocked when the cutoff bar is positioned in the protruding position. The operation prohibiting apparatus comprises a first lever pivotally supported by a base plate, a second lever similarly pivotally supported by the same base plate, a connecting section, for transmitting a rotating force from the first lever to the second lever, an operating knob attached to the first lever, and a cutoff bar fitted onto the second lever. A displacement enlarging mechanism is provided so that a distance between the supporting point of the first lever and the connecting section exceeds a distance between the supporting point of the second lever and the connecting section. A switch is operated to unlock the locking mechanism when the cutoff bar is positioned across the entryway.

Furthermore, in accordance with another embodiment of the invention, an operation prohibiting apparatus is provided for construction equipment in which the cutoff bar comprises a flexible spring core member so that a portion of the cutoff bar is flexible.

Thus, the displacement enlarging mechanism allows the cutoff bar to be positioned to protrude across the entryway and to be withdrawn from the entryway with a smaller operating stroke than the prior art, improving the controllability of the cutoff bar. In addition, even if an impulsive force is applied to the cutoff bar, the flexibility of the cutoff bar absorbs the impulsive force preventing the cutoff bar from being damaged.

BRIEF DESCRIPTION OF THE DRAWINGS

The object and features of the invention will become more readily apparent from the following detailed description of preferred embodiments taken in conjunction with the accompanying drawings in which.

DETAILED DESCRIPTION OF PREFERRED EMBODIMENTS

Figure 1:
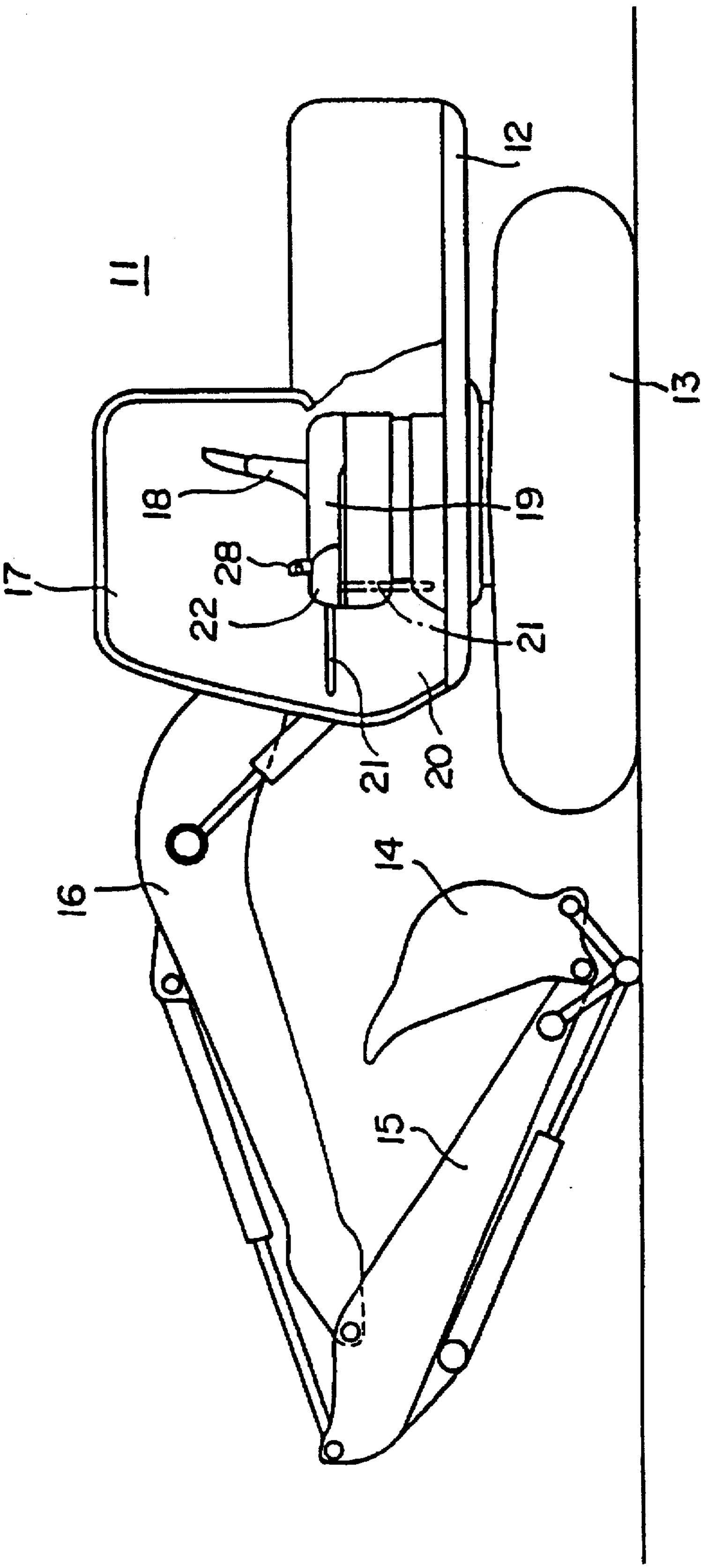
FIG. 1 is aside elevational view showing a piece of construction equipment with an operation prohibiting apparatus according to a preferred embodiment of the invention.
Figure 2:
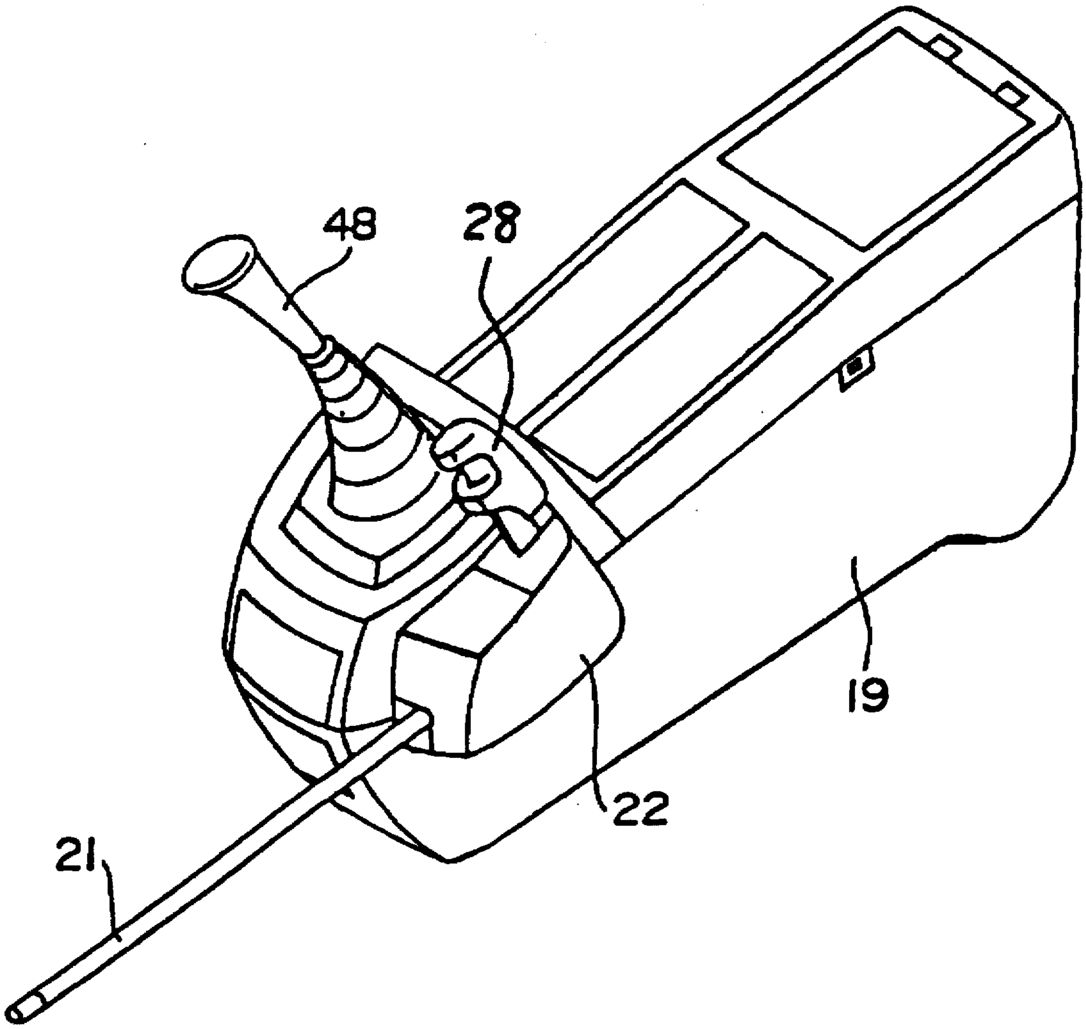
FIG. 2 is a perspective view showing an operating box including the operation prohibiting apparatus according to the preferred embodiment of the invention.

Referring to the drawings, a detailed description will be provided hereinbelow of a preferred embodiment of the invention. FIG. 1 illustrates a power shovel 11 equipped with an operation prohibiting apparatus according to the preferred embodiment of the invention. The power shovel 11 comprises a crawler 13 driven by an engine placed on a base 12 and a bucket 14, an arm 15 and a boom 16 for movably supporting the bucket 14, which are driven by hydraulic control means. An operator cab 17 is located on the base 12 and an operating box 19 is provided at both sides of an operator's seat 18 located within the operator cab 17. An entryway 20 is formed in the operator cab 17 to allow the operator to get in and out of the cab 17. An operation prohibiting apparatus 22 is provided in the entryway 20 at the front side surface of the operating box 19. The operation prohibiting apparatus 22 is equipped with a cutoff bar 21 (two embodiments of the cutoff bar 21 will be described) which can be positioned to protrude across the entryway 20 and can be withdrawn therefrom (see FIG. 2).

Figure 3:
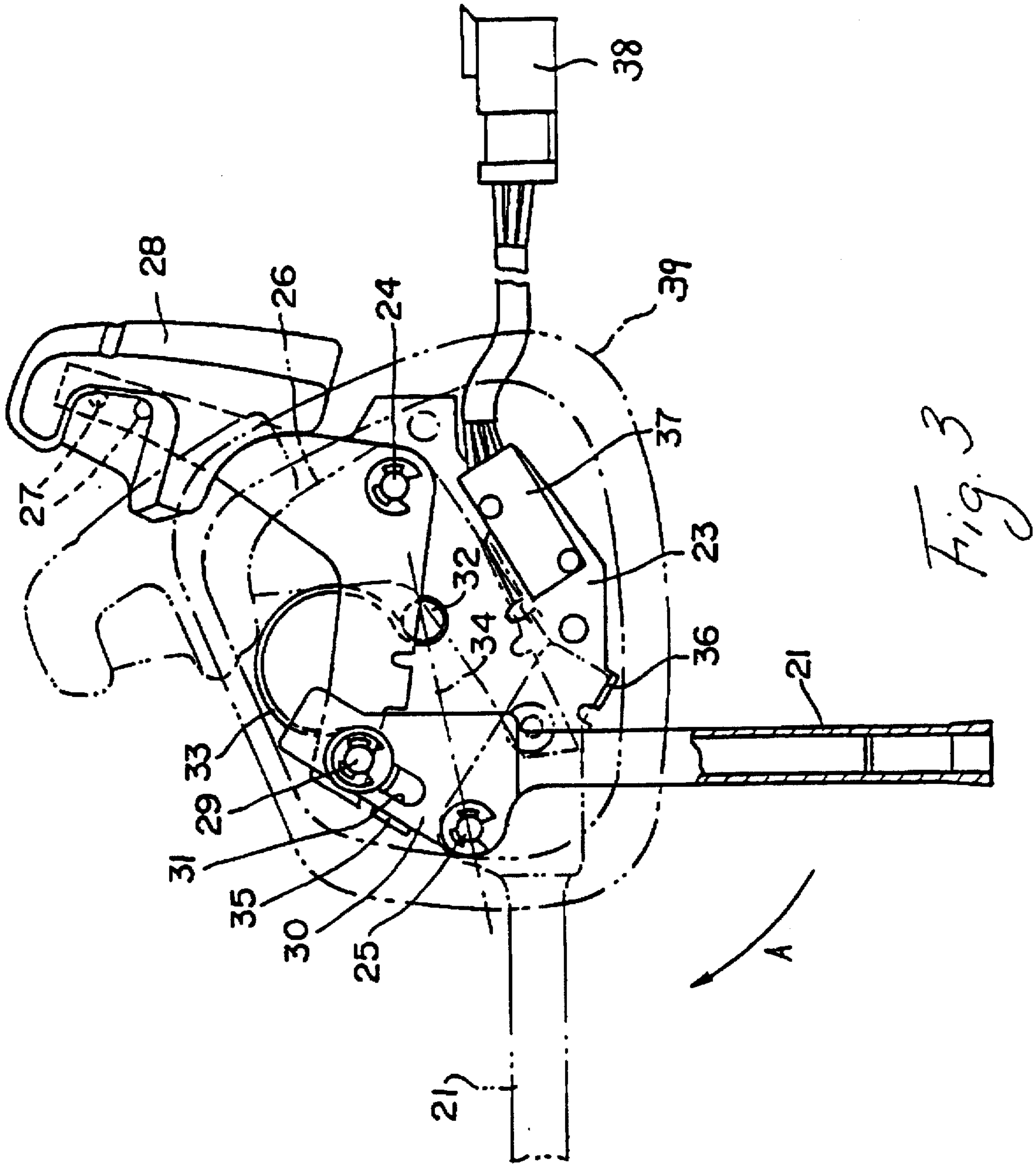
FIG. 3 is an illustration available for describing an internal structure of the operation prohibiting apparatus according to the first embodiment of the invention.
Figure 4:
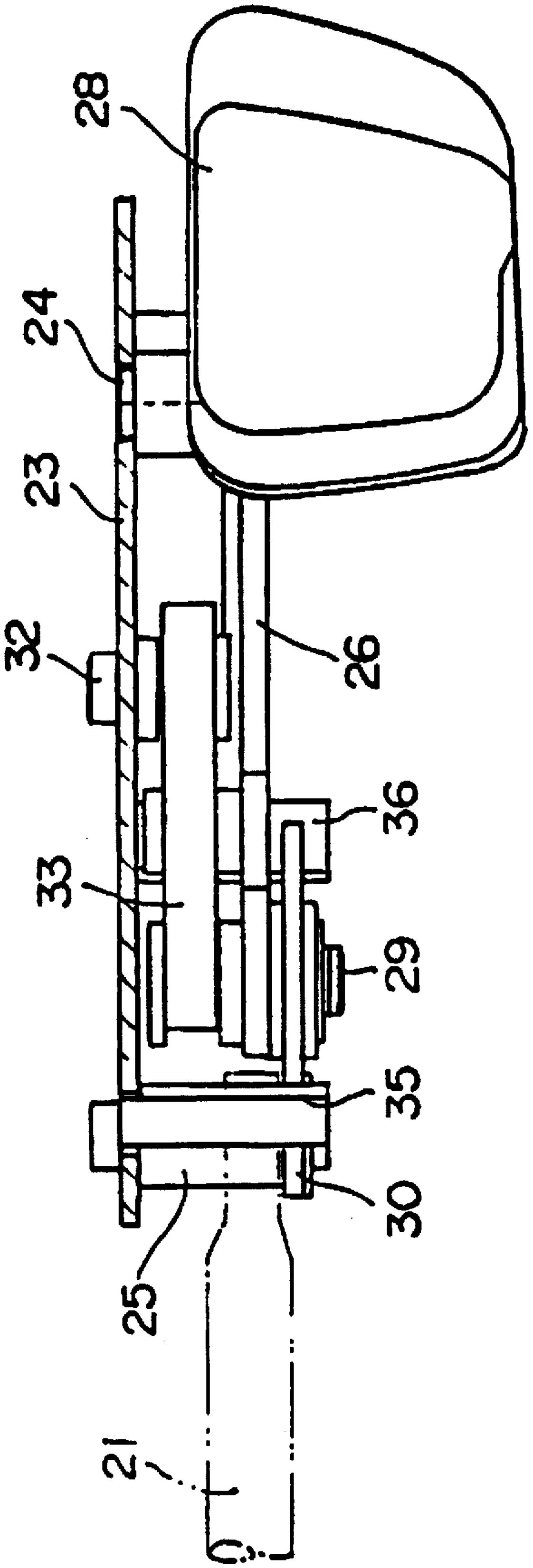
FIG. 4 is a plan view showing the same structure of the operation prohibiting apparatus as in FIG. 3.

The structure of the operation prohibiting apparatus 22 will be described with reference to FIGS. 3 and 4. The operation prohibiting apparatus includes a base plate 23 positioned vertically, with first and second pivot shafts 24, 25 being attached thereto. The first pivot shaft 24 pivotally supports a central portion of a first lever 26 having a generally L-like configuration. An operating knob 28 is attached by a fitting screw 27 to a tip portion (one end portion) of the first lever 26 and a connecting pin 29 is fixedly secured to the other end portion of the first lever 26. The second pivot shaft 25 pivotally supports a second lever 30 integrally formed with a proximal portion of the cutoff bar 21. The second lever 30 has an elongated hole 31 which is loosely engaged with the connecting pin 29.

A spring supporting pin 32 is fitted into the base plate 23, and a spring 33 is provided between the spring supporting pin 32 and the connecting pin 29. The spring 33 has a generally Ω-like configuration when viewed from the side as shown in FIG. 3. The elastic action of the spring 33 holds the cutoff bar 21 appropriately without wobbling in the vertical position, indicated by a solid line in FIG. 3, and at the horizontal position, indicated by a chain line in the same figure. More specifically, in accordance with the movements of the operating knob 28 the connecting pin 29 is displaceable up and down, in FIG. 3, with respect to an axis 34 connecting the spring supporting pin 32 to the second pivot shaft 25. When the connecting pin 29 is located above the axis 34, the second lever 30 is pressed and moved counter-clockwise with respect to the second pivot shaft 25 by the elastic pressing force of the spring 33, and the cutoff bar 21 is maintained in a vertical state (hang-down state) by a stopper 35 that limits its movement. On the other hand, when the connecting pin 29 is located below the axis 34, the second lever 30 is pressed and moved clockwise, in the direction of arrow A, with respect to the second pivot shaft 25 by the elastic action of the spring 33 and the cutoff bar 21 is maintained in the horizontal state (indicated by a chain line in FIG. 3) by means of the movement limiting action of another stopper 36.

A microswitch 37 is attached to the base plate 23. When the first lever 26 moves to the chain-line indicated position so that the cutoff bar 21 is moved to the horizontal position, the microswitch 37 is closed by the movement of the first lever 26 actuating a solenoid valve or the like (not shown) to operate a hydraulic system of the construction equipment thereby permitting the construction equipment to work. On the other hand, when the cutoff bar 21 is moved to the vertical position, the construction equipment is in an operation-inhibited condition. In the Figures, reference numeral 38 designates a connector, reference numeral 39 designates a cover of the operation breaking apparatus, and reference numeral 48 designates an operating lever.

As is obvious from the above description, in the operation breaking apparatus 22 according to the embodiment of the invention, in response to the operating knob 28 being rotationally moved in opposite directions with respect to the first pivot shaft 24, the cutoff bar 21 is displaceable between the horizontal position and the vertical position. When the cutoff bar 21 is in the horizontal position, it blocks the passing of the operator through the entryway 20 of the construction equipment. When the operator displaces the cutoff bar 21 to the vertical position, the operator can pass in and out of the construction equipment, and the hydraulic driving system of the construction equipment is moved to a locked condition.

Thus, in the preferred embodiment, the operating knob 28 is fixedly secured to one end portion of the first lever 26 pivotally supported by the first pivot shaft 24, while the connecting pin 29 is fixedly secured to the other end portion thereof. Further, the cutoff bar 21 is fixedly secured to one end portion of the second lever 30 which is pivotally supported by the second pivot shaft 25 and the elongated hole 31 in the other end portion thereof loosely engages with the connecting pin 29. More-over a displacement enlarging mechanism is designed so that the distance between the connecting pin 29 and the second pivot shaft 25 is shorter than the distance between the first pivot shaft 24 and the connecting pin 29. With this arrangement, in response to the slight movement of the operating knob 28, the cutoff bar 21 is movable widely between the horizontal position and the vertical position. In addition, the operating knob 28 can be located on an upper part of the operating box 19, thereby providing the operation prohibiting apparatus with excellent controllability.

Figure 5:
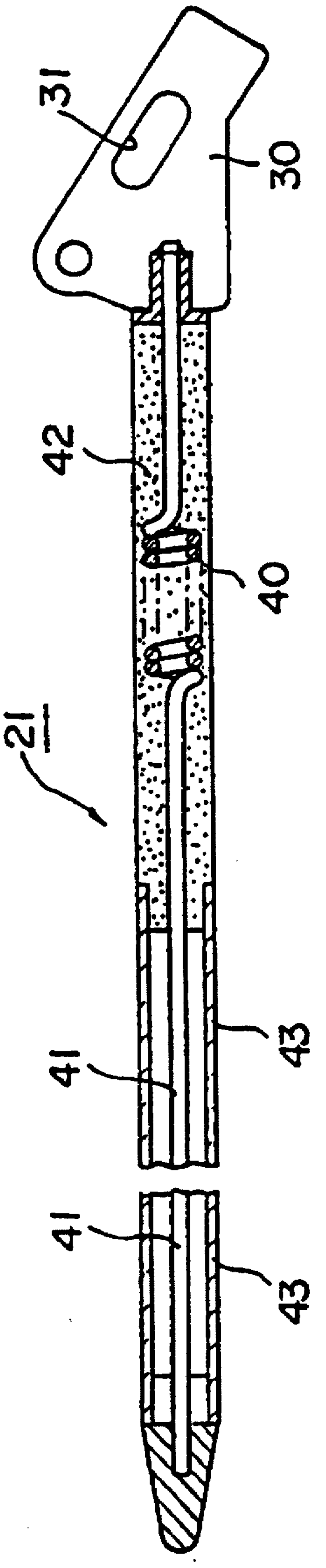
FIG. 5 is a cross-sectional view showing a structure of only a cutoff bar according to a first embodiment of the cutoff bar.
Figure 6:
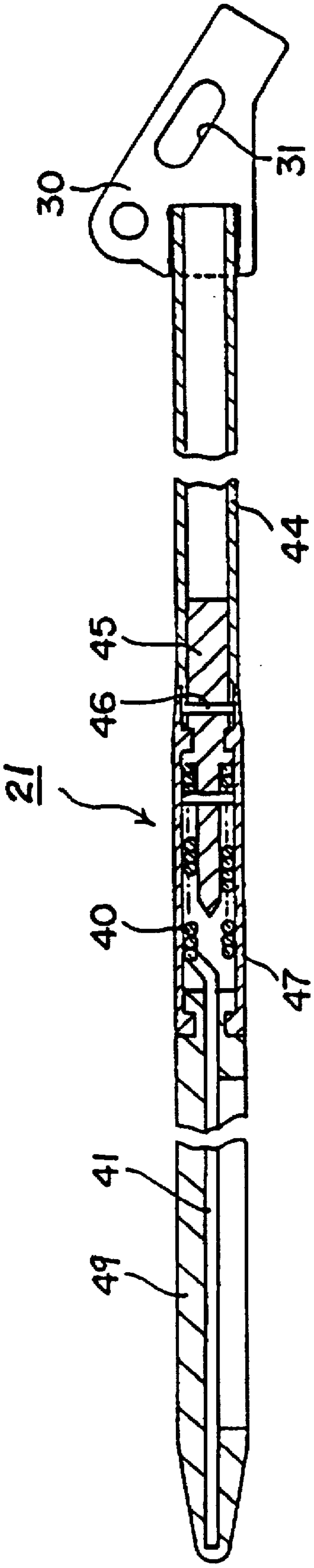
FIG. 6 is a cross-sectional view showing a structure of a cutoff bar according to a second embodiment of the cutoff bar.
Figure 7:
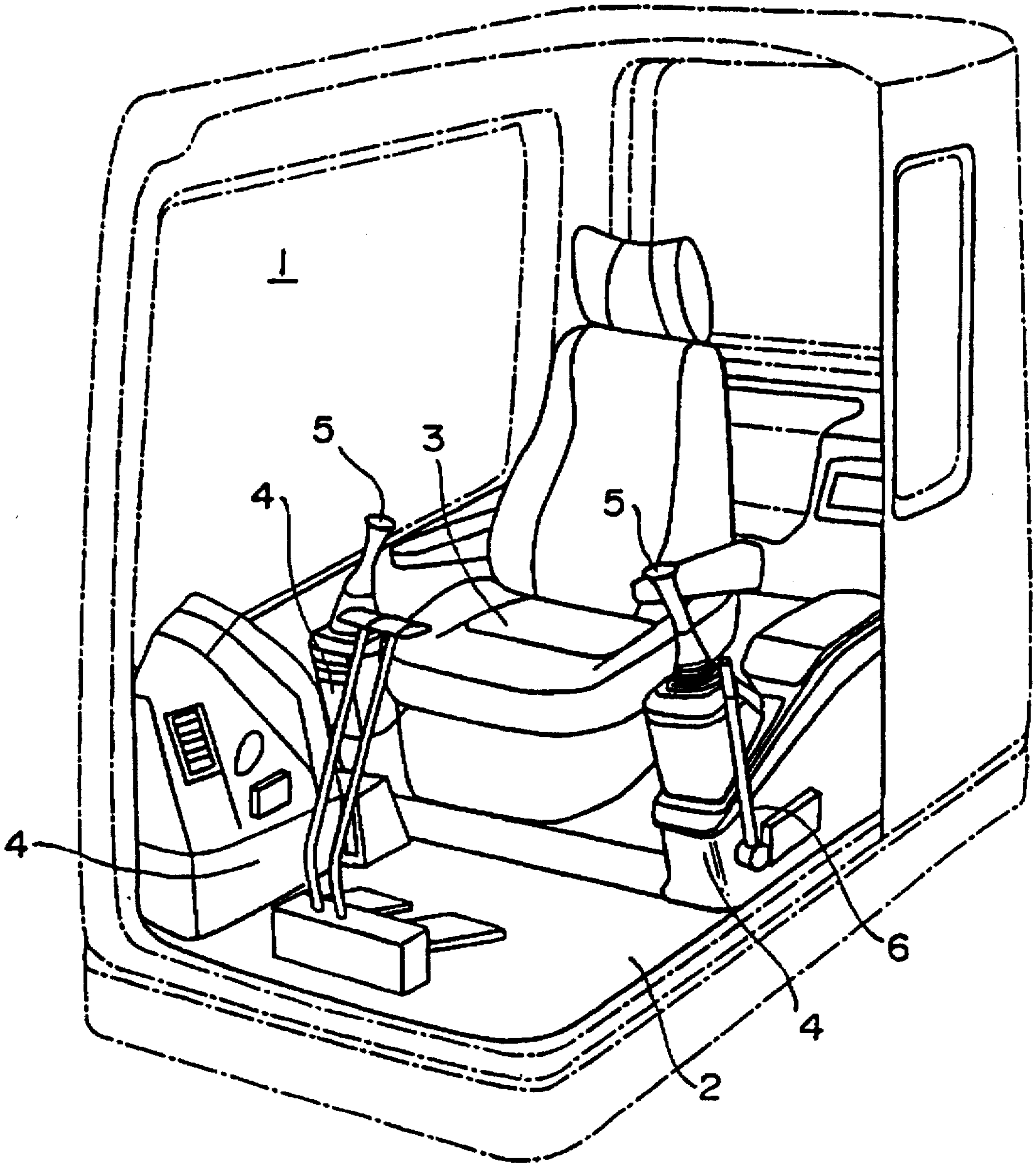
Fig. 7 RELATED ART
FIG. 7 is an illustration of a related art construction equipment operation prohibiting apparatus.

FIGS. 5 and 6 show alternate embodiments of the cutoff bar 21. The cutoff bar 21 shown in FIG. 5 comprises a spring core member 41 having a coil spring section located at one end portion that is fixedly secured to the second lever 30. The circumferential portion of the coil spring section 40 is covered with a flexible rubber member 42 while the other portion of the spring core member 41 is covered with a resin-made pipe 43, thus forming a bar-like configuration.

Thus, the cutoff bar 21 can escape damage due to its flexible construction.

The cutoff bar 21 according to a second embodiment is shown in FIG. 6. A metallic pipe 44 is fixedly secured to the second lever 30 and a spring receiving shaft 45 is fixedly secured by means of a pin 46 to a tip portion of the metallic pipe 44. Further, a spring core member 41 having a coil spring section 40 is fixedly secured to a tip portion of the spring receiving shaft 45, and the circumferential portion of the coil spring section 40 is covered with a flexible pipe 47 made of a soft material such as a rubber. The other portion of the spring core member 41 is covered with a resin-made pipe 49.

Thus, the cutoff bar 21 according to the second embodiment shown in FIG. 6 is provided with a flexible and elastic section comprising the spring section 40 and the flexible pipe 47 which structure saves the cutoff bar 21 from damage.

In the structure according to the invention, since the displacement enlarging mechanism is located between the operating knob and the cutoff bar, irrespective of the slight movement of the operating knob, the cutoff bar is movable widely between the horizontal position and the vertical position. In addition, since the operating knob 28 can be placed on an upper portion of the operating box 19, the operation prohibiting apparatus for the construction equipment exhibits excellent controllability. Moreover, since a longitudinal portion of the cutoff bar is constructed as a flexible and elastic section, the likelihood of damage to the cutoff bar is minimized.

While the invention has been described in conjunction with preferred embodiments thereof, it is evident that many alternatives, modifications and variations may be apparent to those skilled in the art. Accordingly, it is intended to embrace all alternatives, modifications and variations which may fall within the spirit and scope of the appended claims.

What is claimed is:

1. An operation prohibiting apparatus for a piece of construction equipment in which an operating box is located adjacent an operator's seat within an operator cab and an operating lever of the operating box operates a cylinder of a working member, and a cutoff bar is situated in an entryway to the operator's seat such that it can be positioned in a first position in which it protrudes across the entryway and in a second, withdrawn position, the cutoff bar being linked with a locking mechanism of a hydraulic driving system, the locking mechanism being unlocked when the cutoff bar is positioned in the first, protruding position, the operation prohibiting apparatus comprising:

a first lever pivotally supported by a base plate;

a second lever pivotally support by the base plate;

a connecting section for transmitting a rotating force from the first lever to the second lever;

an operating knob attached to the first lever;

a cutoff bar member fitted onto the second lever;

a displacement enlarging mechanism arranged so that a distance between a supporting point of the first lever and the connecting section exceeds a distance between a supporting point of the second lever and the connecting section; and a switch operatable to unlock the locking mechanism when the cutoff bar is positioned in the first, protruding position.

2. The operation prohibiting apparatus of claim 1, wherein the cutoff bar has a flexible spring core member providing the cutoff bar with flexibility.

3. The operation prohibiting apparatus of claim 2, wherein the flexible spring core member includes a coil spring section located at one end portion, the coil spring section being fixedly secured to the second lever, and wherein a circumferential portion of the coil spring section is covered with a flexible rubber member while another portion of the spring core member is covered with a resin-made pipe.

4. The operation prohibiting apparatus of claim 2, wherein the cutoff bar further includes a metallic pipe fixedly secured to the second lever and a spring receiving shaft fixedly secured by means of a pin to a tip portion of the metallic pipe, wherein the flexible spring core member includes a coil spring section located at one end portion, the coil spring section being fixedly secured to a tip portion of the spring receiving shaft, and wherein a circumferential portion of the coil spring section is covered with a flexible pipe while another portion of the spring core member is covered with a resin-made pipe.

5. An operation prohibiting apparatus for construction equipment in which an operating box is located adjacent an operator's seat within an operator cab and an operating lever of the operating box operates a cylinder of a working member, and a cutoff bar is situated in an entryway to the operator's seat such that it can be positioned in a first position in which it protrudes across the entryway and in a second, withdrawn position, the cutoff bar being linked with a locking mechanism of a hydraulic driving system for driving the cylinder, the locking mechanism being unlocked when the cutoff bar is positioned in the first, protruding position, the operation prohibiting apparatus comprising:

a cutoff bar means for blocking the entryway to the operator's seat;

a base plate;

operating knob means for positioning the cutoff bar means;

a first lever means for supporting the operating knob means which is attached thereto, the first lever means being pivotally supported by the base plate;

a second lever means for supporting the cutoff bar means which is fitted thereunto, the second lever means being pivotally support by the base plate;

a connecting means for transmitting a rotating force from the first lever means to the second lever means;

a displacement enlarging means for providing that a distance between a first supporting means for supporting the first lever means and the connecting means exceeds a distance between a second supporting means for supporting the second lever means and the connecting section; and a switch means for unlocking the locking mechanism when the cutoff bar means is positioned in the first, protruding position.

6. The operation prohibiting apparatus of claim 5, wherein the cutoff bar means has a flexible spring core means for providing the cutoff bar means with flexibility.

7. The operation prohibiting apparatus of claim 6, wherein the flexible spring core means includes a coil spring section located at one end portion, the coil spring section being fixedly secured to the second lever means, and wherein a circumferential portion of the coil spring section is covered with a flexible rubber member while another portion of the spring core member is covered with a resin-made pipe.

8. The operation prohibiting apparatus of claim 6, wherein the cutoff bar means further includes a metallic pipe fixedly secured to the second lever means and a spring receiving shaft fixedly secured by means of a pin to a tip portion of the metallic pipe, wherein the flexible spring core means includes a coil spring section located at one end portion, the coil spring section being fixedly secured to a tip portion of the spring receiving shaft, and wherein a circumferential portion of the coil spring section is covered with a flexible pipe while another portion of the spring core means is covered with a resin-made pipe.

9. An operation prohibition device for precluding operation of operating elements of a piece of construction equipment, the prohibition device mounted at an entrance to an operator cab and comprising:

a base plate;

an L-shaped first lever pivotally mounted to the base plate;

a second lever pivotally mounted to the base plate;

an engagement mechanism movably linking one end of the first lever and one end of the second lever;

a handle at the other end of the first lever; and a rod extending from an opposite end of the second lever, wherein the engagement mechanism is further from the pivotal mount of the first lever than it is from the pivotal mount of the second lever.

10. The device of claim 9, wherein the engagement mechanism comprises a pin mounted to the first lever and a slot in the second lever receiving the pin.

11. The device of claim 9, further comprising:

a pin mounted on the base plate between the pivotal mounts of the first lever and the second lever; and a spring mounted between the engagement mechanism and the pin on the base plate.

12. The device of claim 11, further comprising a first stop and a second stop extending from the base plate to define a range of pivotal movement for the second lever.

13. The device of claim 9, wherein the rod has a flexible segment.

14. The device of claim 9, further comprising an operation switch which is activated when the rod is positioned to extend across the entrance of the operator cab.

15. The device of claim 14, wherein activation of the operation switch is provided by contact with an edge of the first lever.

* * * * *